US006779021B1

(12) United States Patent
Bates et al.

(10) Patent No.: US 6,779,021 B1
(45) Date of Patent: Aug. 17, 2004

(54) METHOD AND SYSTEM FOR PREDICTING AND MANAGING UNDESIRABLE ELECTRONIC MAIL

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 750 days.

(21) Appl. No.: 09/627,963

(22) Filed: Jul. 28, 2000

(51) Int. Cl.[7] .......................... G06F 15/16; G06F 17/30; G06F 15/00
(52) U.S. Cl. .......................... 709/206; 709/245; 707/6; 715/531
(58) Field of Search ................................ 709/206, 217, 709/219, 245; 707/3, 6; 715/530, 531, 501.1, 513

(56) References Cited

U.S. PATENT DOCUMENTS

| | | | |
|---|---|---|---|
| 5,283,856 A | | 2/1994 | Gross et al. |
| 5,377,354 A | | 12/1994 | Scannell et al. |
| 5,619,648 A | | 4/1997 | Canale et al. |
| 5,754,939 A | * | 5/1998 | Herz et al. .................. 455/3.04 |
| 5,796,948 A | | 8/1998 | Cohen |
| 5,999,932 A | | 12/1999 | Paul |
| 6,023,723 A | | 2/2000 | McCormick et al. |
| 6,105,046 A | * | 8/2000 | Greenfield et al. .......... 715/530 |
| 6,112,186 A | * | 8/2000 | Bergh et al. .................... 705/10 |
| 6,161,130 A | * | 12/2000 | Horvitz et al. ............... 709/206 |
| 6,199,103 B1 | * | 3/2001 | Sakaguchi et al. ........... 709/206 |
| 6,400,996 B1 | * | 6/2002 | Hoffberg et al. .............. 700/83 |
| 6,421,675 B1 | * | 7/2002 | Ryan et al. ................... 707/100 |
| 6,564,209 B1 | * | 5/2003 | Dempski et al. ................ 707/3 |

OTHER PUBLICATIONS

Drucker et al., "Support Vector Machines for Spam Categorization." In: IEEE Transactions on Neural Networks, Sep. 1999, pp. 1048–1054.*
Androutsopoulos et al., "An Experimental Comparison of Naive Bayesian and Keyword–Based Anti–Spam Filtering With Personal E–mail Messages." In: Proceedings of the 23rd Annual International ACM SIGIR Conference on Research and Development in Information.*
www.brightlight.com Product Details, Brightmail Benefits, Mar. 16, 2000.
www.brightlight.com Product Sheet, Features and Components, Mar. 16, 2000.
www.brightlight.com Overview, Mar. 16, 2000.
www.brightlight.com Media: Press Release Brightmail, Inc., Mar. 16, 2000.

* cited by examiner

*Primary Examiner*—Jack B. Harvey
*Assistant Examiner*—Lambert Tran
(74) *Attorney, Agent, or Firm*—Dillon & Yudell, LLP; Roy W. Truelson

(57) ABSTRACT

In accordance with the present invention, multiple e-mails are received at a network server intended for multiple clients served by the network server. The received e-mails are analyzed to determine patterns of similarity. A selection of similar e-mails are predicted and classified as potentially undesirable e-mail according to the analysis. Upon accessing e-mails from the network server at a data processing system in association with a particular client, the accessed e-mails classified as potentially undesirable e-mail are displayed in a distinct manner from a remainder of the accessed e-mails. Thereafter, in response to a single action by the particular client, the e-mails classified as potentially undesirable e-mail are removed from display, such that the particular client is enabled to efficiently manage removal of e-mails predicted as undesirable by a network server.

33 Claims, 6 Drawing Sheets

METHOD AND SYSTEM FOR PREDICTING AND MANAGING UNDESIRABLE ELECTRONIC MAIL

BACKGROUND OF THE INVENTION

1. Technical Field

The present invention relates in general to networks and, in particular, to controlling distribution of undesirable mail within a network. Still more particularly, the present invention relates to analyzing electronic mail to predict and classify undesirable electronic mail prior to transmission to a client, such that the client is enabled to quickly manage removal of undesirable electronic mail.

2. Description of the Related Art

Computer networks, such as the Internet, are typically based on client-server software architectures. These architectures provide a versatile infrastructure that supports shared access to server resources, such as receiving and transmitting electronic mail(e-mail). A client is typically a requester of services, and a server is the provider of services. A single machine can be both a client and a server depending on the software configuration. A typical client machine is loaded with client software, while a typical server machine is loaded with server software. Clients can be either stand-alone computer systems(like personal computers) or "dumber" systems adapted for limited use with a network (e.g. dumb terminals).

A generalized client-server computing network has several nodes or servers which are interconnected, either directly to each other or indirectly through one of the other servers. Based on network configuration, the connection by the client to the network may be via connections including, but not limited to, an Ethernet connection or token ring. Other direct and/or indirect connection methods(e.g. telephone connection via remote access protocol) are also possible when a client is connected from a user's home, for example.

The network can be a localized network or a geographically dispersed network and can be further connected to other networks. Each server is essentially a stand-alone data processing (computer) system, having one or more processors, memory devices, and communications devices, that has been adapted (programmed) for providing information and/or services to individual users at another set of nodes or client workstations.

In many networks, a primary function of a server is receiving e-mail addressed to clients and transmitting e-mail composed received from clients. The rapid increase in the number of users of electronic mail(e-mail) and the low cost of distributing electronic messages via the Internet and other electronic communications networks has made marketing via e-mail an attractive advertising medium. Consequently, e-mail is now frequently utilized as the medium for widespread marketing of messages to e-mail addresses, commonly known as "spam."

Users of e-mail, however, frequently are not eager to have e-mail boxes filled with unsolicited e-mails. Users accessing the Internet through Internet Service Providers (ISPs) such as America Online™ (AOL) or Microsoft Network™ (MSN), application service providers (ASPs), portal providers, or large businesses such as IBM and General Motors (GM) are often targeted by e-mail marketers.

The sending and receiving of unsolicited e-mail messages are increasing problems for both ISPs and corporations. In particular, unsolicited sending and receiving of e-mail can unnecessarily utilize data storage space on servers and for ISPs unsolicited mail reduces customer satisfaction. In addition, unsolicited mail may includes viruses, worms, or other destructive attachments that can easily be transmitted within a server upon activation at a single client within a network.

There are a number of methods being utilized for filtering unsolicited e-mails at an e-mail server and/or in association with e-mail software packages, such as Lotus Notes™ (Lotus Notes is a trademark of IBM), executing on client systems. One such method is designed to block a user from receiving e-mails from particular e-mail addresses or e-mails that include particular keywords or character strings. However, this approach is vulnerable in that marketers may quickly adjust an address or domain name from which unsolicited e-mails are transmitted and thereby outdate address blocking lists. In addition, marketers and others producing spam may adjust wording of text messages or transmit unsearchable attachments in order to temporarily avoid blocking lists. Moreover, most ISPs cannot provide blocking services to a customer unless the services are specifically requested by that customer.

Other known e-mail filtering techniques are based upon an inclusion list, such that e-mail received from any source other than one listed in the inclusion list is discarded as junk. In addition, a user may designate keywords of interest such that e-mails containing keywords of interest to the user are placed in the user's "inbox". However, these methods require the user and/or ISP to continually update the inclusion list. Therefore, inclusion lists are typically only as intelligent as a user makes them and may easily become outdated.

Some methods combine the use of blocking lists and inclusion lists and distinguish e-mails that are not filtered by either list. For example, U.S. Pat. No. 6,023,723 ('723) describes a filtering system that filters e-mail at a user's network computer according to a list of desired addresses and character strings and undesired addresses and character strings. Any e-mail that is not included or discarded is sent to a "waiting room" for the user to review. If a user rejects an e-mail in the waiting room, the address as well as specific character strings included in the e-mail are included in the list of undesired receiving addresses. However, the use of a "waiting room" is limited in that it does not provide a prediction of whether or not an e-mail is desirable, but just that the e-mail does not fit the criteria for inclusion or blocking. A user must still look through each e-mail and remove undesirable e-mails individually.

Other known methods may utilize additional conditional filtering mechanisms in order to filter through multiple diverse e-mail messages. For example, U.S. Pat. No. 5,999,932 ('932) utilizes a first filter to sort through messages with an inclusion list at a user's computer and included messages are marked "OK". Next, a heuristic process is performed to determine if the remaining e-mail messages may be of interest to the user. Heuristic processing may evaluate each message according to rules such as whether or not the "From" field of the e-mail matches a "To" entry from the user's inclusion list. In another example, U.S. Pat. No. 5,283,648('648) describes conditional rule-based e-mail filtering utilizing "when-if-then" rules designated by a user. However, both '932 and '948 require a user to update conditional filtering criteria in order to evaluate new and changing e-mail spam techniques. In addition, neither technique provides for predicting whether or not an e-mail is spam.

In addition to user-designated blocking and inclusion lists, network servers and other services may determine and recommend blocking criteria. For example, in the '723 patent, addresses and character strings of rejected e-mails are periodically transmitted to a network location and included in a master list where rejected e-mail information from multiple network users is compiled. The master list is periodically sent to each network computer to allow the filter of undesired addresses and character strings to be updated for each network user. However, determining undesirable electronic mail after rejection by users means that the '723 method relies on numerous user's wasting time reading and rejecting e-mail from a particular address or including particular words before the master list is updated. In addition, a virus or other destructive bug may reach many users with detrimental effects by the '723 method before the master list is updated.

In another example, Brightmail Inc. ™ provides software for ISPs that creates a Spam Wall™ on network servers to block current spam attacks and 24-hour updating of spam-identifying rules for the software in order to block new spam attacks. In order to update the spam-identifying rules, a probe network utilizes "seeded" e-mail addresses to attract spam, analysts write blocking rules for the attracted spam, and spam walls are updated with the blocking rules on all network servers utilizing the service. While the Brightmail method provides for structuring a spam wall to keep rule-identified spam from reaching users who subscribe to the service, the method is not specified for individual ISPs or corporations that may be individually targeted by a particular marketer. In addition, a user is not provided with a quantified prediction as to whether or not an electronic mail is spam or a simple method of removing undesirable mail.

In view of the foregoing, it would be advantageous to provide a method for automatically analyzing electronic mail as it arrives at a network server to determine patterns among incoming e-mails and classify potential spam. In classifying potential spam, it would be advantageous for the user to be enabled to both view and easily discard e-mails designated by the network server as potential spam.

SUMMARY OF THE INVENTION

In view of the foregoing, it is therefore an object of the present invention to provide an improved method, system and program for managing networks.

It is another object of the present invention to provide a method, system and program for controlling distribution of undesirable mail within a network.

It is yet another object of the present invention to provide a method, system and program for analyzing electronic mail to predict and classify undesirable electronic mail prior to transmission to a client, such that the client is enabled to quickly manage removal of undesirable electronic mail.

In accordance with the present invention, multiple e-mails are received at a network server intended for multiple clients served by the network server. The e-mails are analyzed to determine patterns of similarity. A selection of similar e-mails are predicted and classified as potentially undesirable e-mail according to the analysis, such that e-mails classified as potentially undesirable e-mail are identified to the multiple clients upon access of e-mails from the network server.

Upon accessing e-mails from the network server at a data processing system in association with a particular client, the accessed e-mails classified as potentially undesirable e-mail are displayed in a distinct manner from a remainder of the accessed e-mails. Thereafter, in response to a single action by the particular client, the e-mails classified as potentially undesirable e-mail are removed from display, such that the particular client is enabled to efficiently manage removal of e-mails predicted as undesirable by a network server.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is directed to a method, system and program product implemented within a client-server system, which allows a server to predict undesirable e-mails and a client to display the predicted undesirable e-mails in a distinguishing manner. As utilized within the invention, the term "predicted" refers to both a quantitative prediction(e.g. a percentage of predictability as spam) and a boolean prediction(e.g. spam or not spam).

Figure 1:
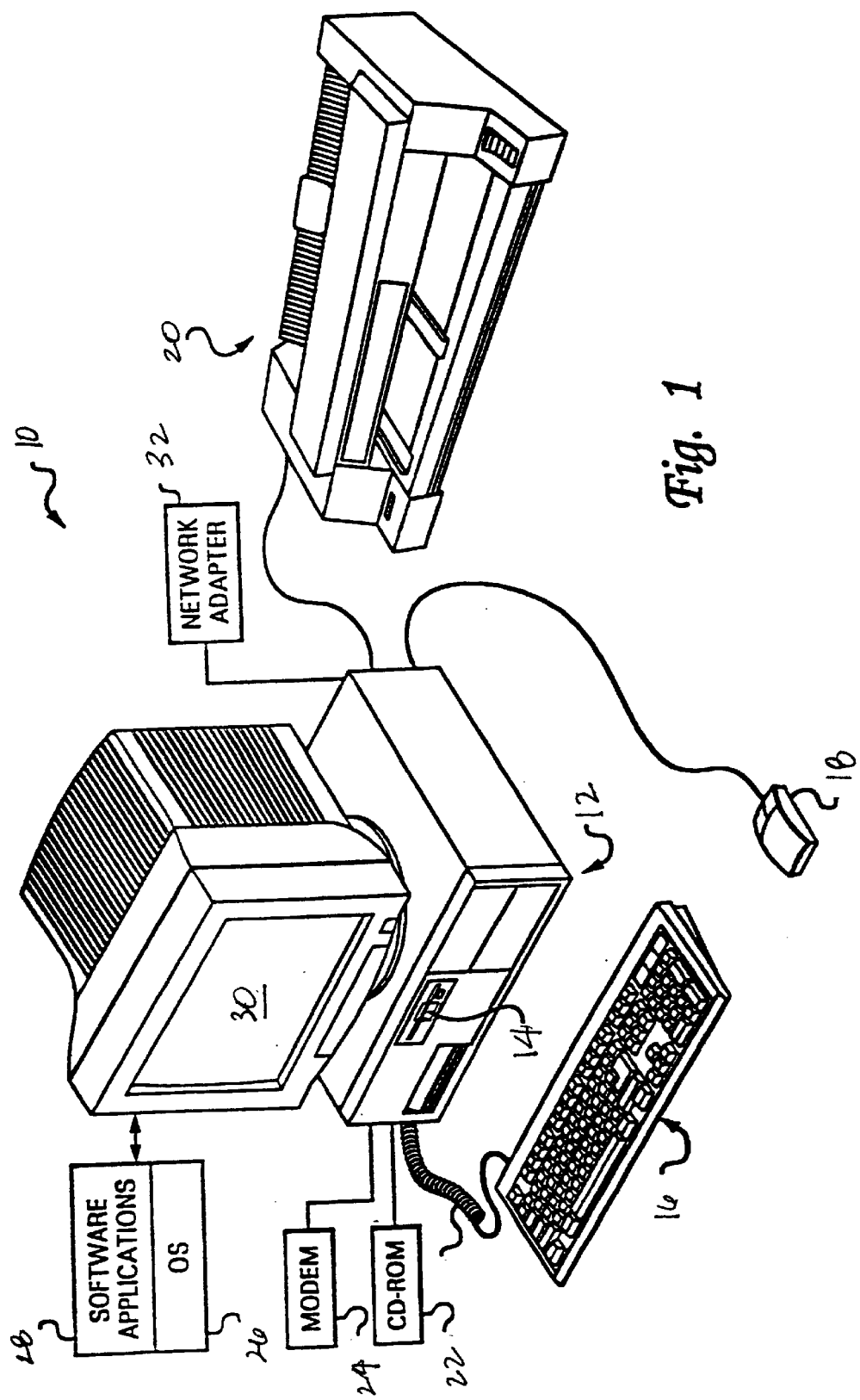
FIG. 1 depicts a perspective diagram of one embodiment of a computer system that may utilize the present invention.
Figure 2:
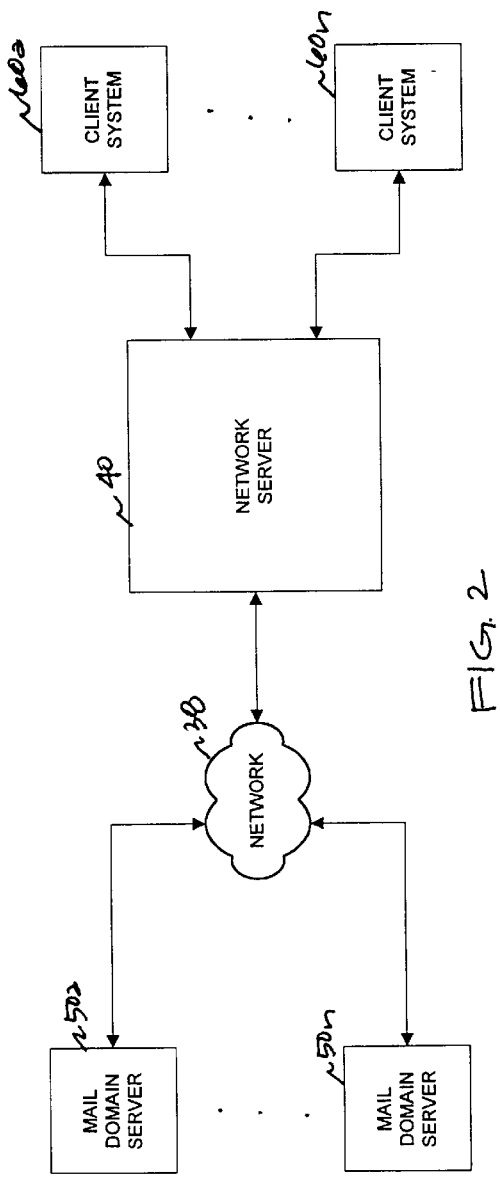
FIG. 2 illustrates a block diagram of a network system in accordance with the method, system and program of the present invention.

The invention is implemented in the data processing system and network environment as illustrated in FIGS. 1 and 2, respectively. The invention may, however, be implemented in other types of data processing systems and networks, so while the present invention may be described with references to these figures, these references should not be construed in a limiting sense.

For the purposes of this invention, the term "client" is utilized to refer to both the hardware component which is connected to a network server and the software applications stored in memory and being run on the hardware component. Also the term client is utilized to mean both a directly connected network computer system and a stand-alone computer system, such as a user's home-based computer system. In the preferred embodiment, a client is provided with an e-mail application and connection utility for accessing the Internet via server possible connection routes. The term "user" refers primarily to an individual who utilizes the client. Further, the invention applies to connections to servers of both an intranet and Internet via the e-mail application running on the client.

The term "server" is also utilized to refer to both the hardware component which provides networking services and the software applications stored in memory and being run on the hardware component. The servers of the network are typically data processing systems having a database, operating system (OS), and server software. The server software operates within a network server and provides the support for e-mail service to clients. In particular, server hardware preferably includes multiple processors functioning synchronously in order to manage requests from multiple clients.

With reference now to the figures and in particular with reference to FIG. 1, a computer system that may be utilized as a stand-alone computer system or one of the clients or servers on a network is presented. A computer system 10 comprises a Central Processing Unit (CPU) houses in a system unit 12. System unit 12 also provides connections for various hardware components including disk drives 14 and memory devices (not shown). Several Peripheral input/output devices are connected to the CPU. These input/output devices include a keyboard 16, a mouse 18, a printer 20, a compact disk read-only memory (CD-ROM) 22, and a display monitor 30. Moreover, additional and alternate types of input/output devices may be utilized with computer system 10 as will be understood by one skilled in the art.

Also coupled to system unit 12 are various networking components, including modem 24 and network adapter 32, utilized for connecting computer system 10 to other systems and/or networks, as is illustrated in FIG. 2. Modem 24 is a communication device that enables computer system 10 to transmit information over a standard telephone line or wireless connection. Modem 24 converts digital computer signals to interlock signals suitable for communications over these telephone media. Network adapter 32 may provide a network connection for computer system 10 to a network, such as the Internet, via multiple types of communication media such as a direct service line (DSL) connection, a wireless phone connection, a satellite connection, a cable modem connection, and other communication media which are known in the art.

Computer system 10 also preferably includes an interface, such as a graphical user interface (GUI) provided by an operating system (OS) 26 that resides within machine readable media to direct the operation of computer system 10. Any suitable machine-readable media may retain the OS, such as random access memory (RAM), ROM, and other disk and/or tape drive(e.g. magnetic diskette, magnetic tape, CD-ROM, optical disk, or other suitable storage media). Also any suitable OS 26, may direct the CPU of the computer system 10.

Further, computer system 10 preferably includes at least one software application (program product) 28 that resides within machine readable media. The software application may be accessible by OS 26, or may be incorporated into an OS control program. Preferably software application 28 contains instructions that when executed on the CPU carry out the particular operations of the present invention as described herein.

With reference now to FIG. 2, there is depicted a block diagram of a network system in accordance with the method, system and program of the present invention. As depicted, multiple mail domain servers 50a–50n are connected to a network server 40 via a network 38, such as the Internet. E-mails originating from each of mail domain servers 50a–50n are preferably required to be marked with at least the domain of the originating mail server in a manner that is understandable by any server system receiving the e-mails. While in the present embodiment network server 40 receives e-mails from any of mail domain servers 50a–50n, in alternate embodiments, network server 40 may receive e-mails from alternate types of network-accessible systems.

In the present invention, network server 40 receives e-mail from mail domain servers 50a–50n intended for e-mail addresses serviced by the ISP, ASP, business or other provider associated with network server 40. Network server 40 filters through each e-mail and predicts its likelihood as undesirable mail or spam. Each electronic mail that is predicted as spam is marked as such by network server 40. In particular, network server 40 utilizes a multiple step filtering technique that in one step detects similar patterns in selections of e-mails being received at network server 40 to determine the likelihood of e-mails as spam, as will be further described. While in the present embodiment network server 40 is depicted as a single unit, network server 40 may incorporate multiple server systems.

When a user logs onto network server 40 via an e-mail application executing on one of client systems 60a–60n, e-mails received for that user at network server 40 are transmitted to the appropriate client system and output to the user at the client system as controlled by an e-mail application executing thereon. In particular, in the present invention, the e-mail application controls displaying e-mails that are received from network server 40 as predicted spam in a distinct manner. For example, distinct color shading for predicted spam, lower order listing for predicted spam, or listing predicted spam in a separate category may be display methods utilized. A user is preferably enabled to utilize a single transaction, such as clicking a particular graphical icon or inputting a particular key command to remove all e-mails predicted as spam, as will be further described.

Figure 3:
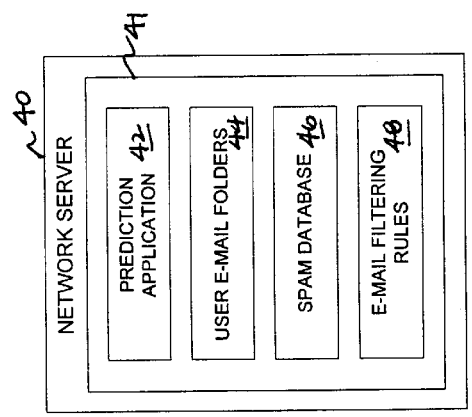
FIG. 3 depicts a block diagram of a network server in accordance with the method, system and program of the present invention.

Referring now to FIG. 3, there is depicted a block diagram of a network server in accordance with the method, system and program of the present invention. As illustrated, network server 40 includes a prediction application 42, an e-mail folder 44, a spam database 46, and e-mail filtering rules 48 incorporated within a data storage medium 41 that may be internally, externally or remotely accessible to network server 40.

E-mail folder 44 preferably provides storage of all incoming and outgoing e-mails according to user account. In addition, log-in information and inclusion/blocking preferences for a user may be stored in e-mail folder 44 in association each user account.

Prediction application 42 analyzes all incoming e-mail to predict the likelihood of each e-mail as spam. In predicting e-mail as spam upon receipt at network server 40, a particular indicator is attached to the e-mail prior to placement of the e-mail in user e-mail folders 44. In addition, when a particular type of e-mail is determined as spam, prediction application 42 preferably scans e-mails already placed in user e-mail folders 44 and marks any related e-mails as predicted spam.

As an additional feature, prediction application 42 may also analyze out-going e-mail in the same manner as in-coming e-mail to predict the likelihood of each outgoing e-mail as spam. Thereby, a corporation or other provider that hosts network server 40 may utilize spam prediction filters to detect out-going spam and further restrict employees or other users from utilizing e-mail accounts to transmit spam. This feature is particularly helpful in subduing the spread of viruses, such as those that automatically transmit themselves utilizing client e-mail address books.

Multiple levels of prediction may be determined by prediction application 42. For example, a percentage of likelihood as spam may be determined by prediction application 42. In another example, prediction application 42 may predict that a particular e-mail is in a particular category of spam, such as viral, job marketing, pornographic, etc.

In particular, multiple levels of filtering may be utilized to achieve multiple levels of prediction of spam. E-mail filtering rules database 48 preferably includes the filtering rules designated for network server 40 and determined by prediction application 42 in response to predicting and confirming spam. In addition to filtering rules being designated by prediction application 42, network server 40 may receive e-mail filtering rules from an alternate source, such as a human operator writing filtering rules.

In a preferred embodiment, during the first filtering process, prediction application 42 looks for an unusually large number of users receiving the same e-mail from a particular user address in a given time period. For example, if more than five percent of users receive an e-mail from a particular user address within one minute, then prediction application 42 may predict that the e-mail is spam.

In particular, prediction application 42 not only checks the "TO" list to see how many users an e-mail is sent to, but checks to see if a single user address (or domain) is sending many tailored spam notes to individuals serviced by network server 40. Therefore, in a second filtering process if a large number of tailored e-mails are received from a single user address or domain, prediction application 42 preferably compares the messages to determine similarities in content. If there is a large percentage of similarity in content, then prediction application 42 preferably marks these e-mails as predicted spam. A percentage of predictability may increase as the number of users receiving the tailored e-mails from one user address or domain increases.

In addition, a third filtering technique compares e-mails that are not from the same user address or domain. If there are a group of messages that arrive within a particular time period and the messages contain a large percentage of common content, prediction application 42 may predict that the group of messages are spam.

In performing the third filtering technique, several processor time-saving techniques may be utilized such that the content of each e-mail received need not be compared with the content of every other e-mail received. For example, prediction application 42 may determine users and groups of users that typically receive spam from the same source and utilize this data to determine which e-mails to compare. In another example, the rough size of the e-mail messages can act as a guide to determine if messages are likely to have similar content (e.g. all messages that are between 10K and 12K may be compared). In yet another example, a comparison of subject lines may first be performed to look for similar character strings and then the content of messages with similar character strings compared. Moreover, in another example, the user addresses and domains that have been associated with spam may be updated in order to determine which messages to check as possible spam. Furthermore, in another example, e-mails may have scanned for embedded Hypertext mark-up language(HTML) links that have been associated with spam. On the same lines, e-mails may have embedded HTML links where if more than a designated number of HTML links are included in an e-mail it is predicted as spam.

Spam database 46 is preferably utilized with each of the filtering techniques in order to predict and block spam. In particular, spam database 46 may contain a history of all e-mails sent to and received from network server 40 in a database format that can be searched according to sender, recipient, title, content, etc. in a manner that is time-saving. In addition, predicted spam is preferably designated in spam database 46 such that each e-mail received at network server 40 can be filtered according to already predicted and confirmed spam.

Network server 40 may receive responses from client systems 60*a*–60*n* indicating that an e-mail predicted as spam was not spam or that an e-mail not predicted as spam was spam. In either case, a user's account is preferably updated according to the user response so that future e-mails received from a particular address or domain are correctly handled by network server 40. In addition, a record of the user response may be designated in spam database 46. In particular, if a particular number of users respond that a particular e-mail marked as spam is not spam, then prediction application 42 may adjust any un-opened copies of the particular e-mail and designate that the particular e-mail should not be marked as spam for future entries.

Figure 4A:
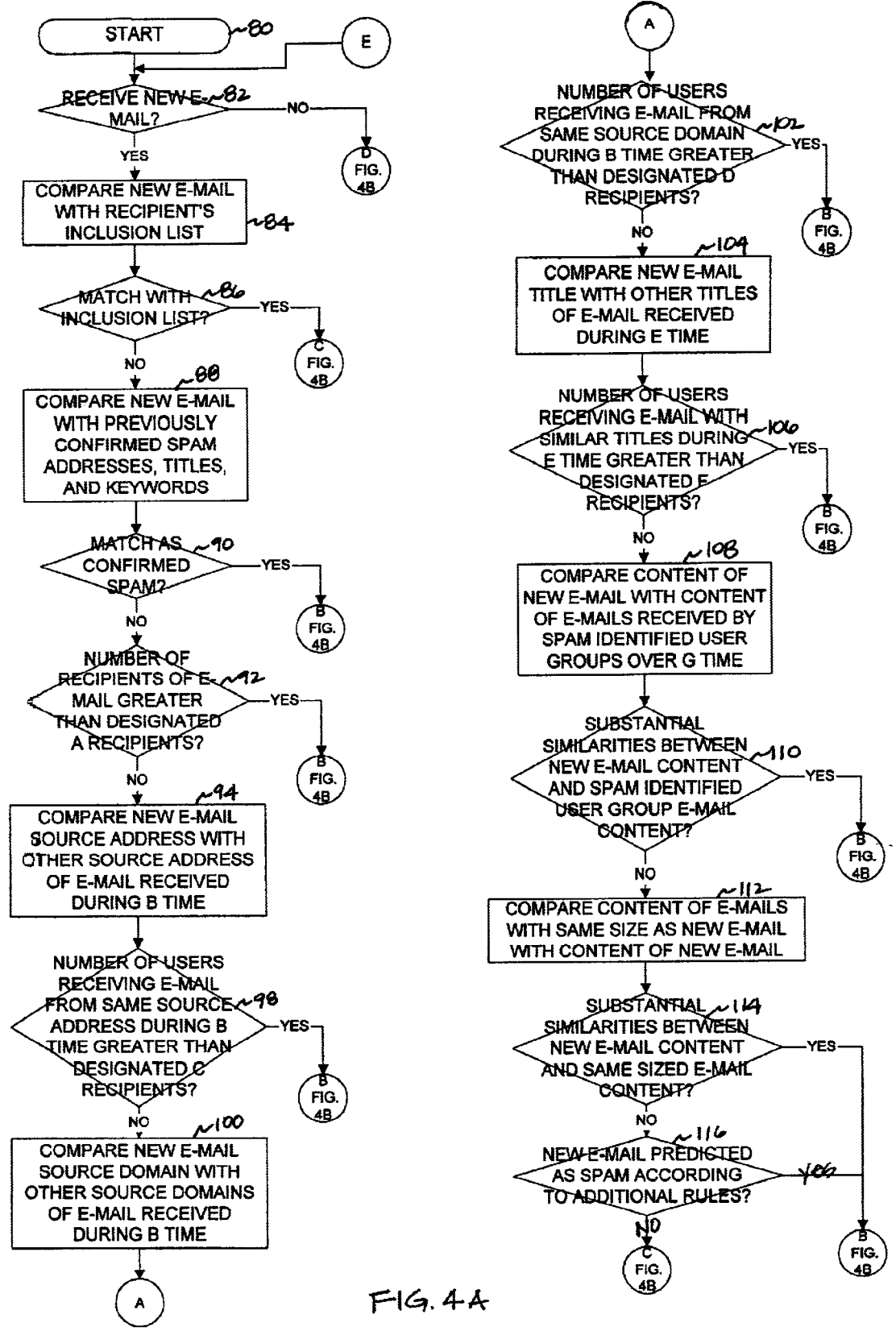
FIGS. 4a–4b illustrates a high level logic flowchart of a process for predicting undesirable e-mails in accordance with the present invention.
Figure 4B:
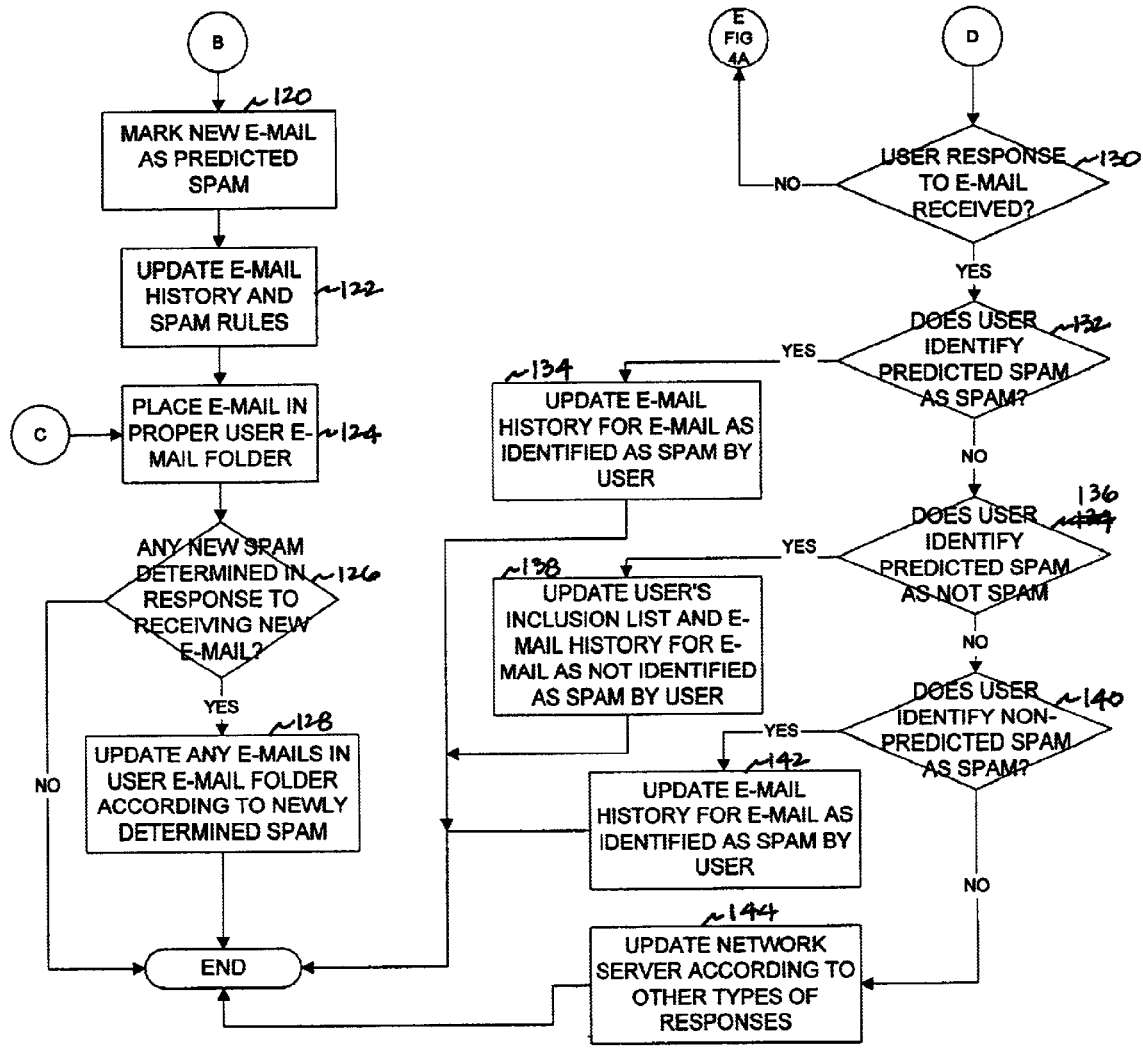

Referring now to FIGS. 4*a*–4*b*, there is illustrated a high level logic flowchart of a process for predicting undesirable e-mails in accordance with the present invention. As depicted, the process starts at block 80 and thereafter proceeds to block 82. Block 82 illustrates a determination as to whether or not new e-mail is received. If new e-mail is not received, then the process passes to block 130. If new e-mail is received, then the process passes to block 84.

Block 84 depicts comparing the new e-mail with recipients in an inclusion list designated in the spam filtering rules for the server. In addition, the user to whom the e-mail is intended may have an inclusion list maintained at the e-mail server to which the new e-mail is compared. Next, block 86 illustrates a determination as to whether or not a match with the server and/or user-based inclusion list is found. If a match for the new e-mail in an inclusion list is found, then the process passes to block 124. If a match for the new e-mail in an inclusion list is not found, then the process passes to block 88.

Block 88 illustrates comparing the new e-mail with previously confirmed spam addresses, titles, and keywords from the spam filtering rules. Next, block 90 depicts a determination as to whether or not the new e-mail is a confirmed match as spam. If the new e-mail is a confirmed match as spam, then the process passes to block 120. If the new e-mail is not a confirmed match as spam, then the process passes to block 92.

Block 92 depicts a determination as to whether or 1C not the number of recipients of the new e-mail is greater that a designated "A" number of recipients. In particular, a rule designating the "A" number of recipients is preferably included in spam filtering rules for the server and may be adjusted by the prediction application executing on the server according to confirmed spam received at the server. In addition, an outside source may designate the "A" number of recipients above which an e-mail is predicted as spam. If the number of recipients of the new e-mail is greater than a designated "A" number of recipients, then the process passes to block 120. If the number of recipients of the new e-mail is not greater than a designated "A" number of recipients, then the process passes to block 94.

Block 94 illustrates comparing the new e-mail source address with the source addresses of e-mail received during a designated "B" time period. In particular, a rule designating the "B" time period is preferably included in spam filtering rules for the filter and may be adjusted by the prediction application executing on the server or by an alternate source. Next, block 98 depicts a determination as to whether or not the number of users receiving e-mail from the same source address during the "B" time period is greater than a designated "C" number of recipients. If the number of users receiving e-mail from the same source address during the "B" time period is greater than a designated "C" number of recipients, then the process passes to block 120. If the number of users receiving e-mail from the same source address during the "B" time period is not greater than a designated "C" number of recipients, then the process passes to block 100.

Block 100 depicts comparing the new e-mail source domain with the source domain of e-mail received during a designated "B" time period. Next, block 102 illustrates a determination as to whether or not the number of users receiving e-mail from the same source domain during the "B" time period is greater than a designated "D" number of recipients. If the number of users receiving e-mail from the same source domain during the "B" time period is greater than a designated "D" number of recipients, then the process passes to block 120. If the number of users receiving e-mail from the same source domain during the "B" time period is not greater than a designated "D" number of recipients, then the process passes to block 104.

Block 104 illustrates comparing the new e-mail title with other titles of e-mails received during a designated "E" time period. Next, block 106 depicts a determination as to whether or not the number of users receiving e-mails with similar titles to the new e-mail during the designated "E" time period is greater than a designated "F" number of recipients. If the number of users receiving e-mails with similar titles to the new e-mail during the designated "E" time period is greater than a designated "F" number of recipients, then the process passes to block 120. If the number of users receiving e-mails with similar titles to the new e-mail during the designated "E" time period is not greater than a designated "F" number of recipients, then the process passes to block 108.

Block 108 depicts comparing the content of the new e-mail with content of e-mails received by spam-identified user groups over a designated "G" time period. In particular, groups of users that frequently receive spam may be identified by a prediction application executing on the server in order that new e-mails are compared with e-mails receives by these spam-identified user groups. Next, block 110 illustrates a determination as to whether or not there are substantial similarities between the content of the new e-mail and the content of the spam-identified user group e-mail. If there are substantial similarities between the content of the new e-mail and the content of the spam-identified user group e-mail, then the process passes to block 120. If there are not substantial similarities between the content of the new e-mail and the content of the spam-identified user group e-mail, then the process passes to block 112.

Block 112 illustrates comparing the content of e-mails that are the same size as the new e-mail with the content of the new e-mail. Spam filtering rules designated at the server preferably designate grouping of previously received e-mails that may be utilized for size comparison. Thereafter, block 114 depicts a determination as to whether or not substantial similarities in content are found between the new e-mail and a particular amount of same sized e-mail. If there are substantial similarities in content between the new e-mail and a particular amount of same sized e-mail, then the process passes to block 120. If there are not substantial similarities in content between the new e-mail and a particular amount of same sized e-mail, then the process passes to block 116.

Block 116 depicts a determination as to whether or not the new e-mail is predicted as spam according to additional spam filtering rules designated at the server. If the new e-mail is predicted as spam according to additional spam filtering rules, then the process passes to block 120. If the new e-mail is not predicted as spam according to additional spam filtering rules, then the process passes to block 124. Block 120 illustrates marking the new e-mail as predicted spam. In particular, in marking the new e-mail as predicted spam, a percentage of predictability may be assigned, a category of spam may be assigned, and/or other assignments may be made to designate the new e-mail as predicted spam. Next, block 122 depicts updating the e-mail history and spam rules. Thereafter, block 124 illustrates placing the new e-mail in the proper user e-mail folder; and the process passes to block 126.

Block 126 depicts a determination as to whether or not any new spam rules are determined in response to receiving the new e-mail. If new spam rules are not determined, then the process ends. If new spam rules are determined, then the process passes to block 128. Block 128 illustrates updating any e-mails already placed in the user e-mails folders according to the newly determined spam rule; and the process ends.

Block 130 illustrates a determination as to whether or not a user response to e-mail is received. In receiving a user response to e-mail, the user may indicate multiple types of responses in order that the spam filtering rules and e-mail history at the server may be updated. If a user response to e-mail is not received, then the process passes to block 82. If a user response to e-mail is received, then the process passes to block 132.

Block 132 depicts a determination as to whether or not a user identifies predicted spam as spam. If a user designates predicted spam as spam, then the process passes to block 134. Block 134 illustrates updating the e-mail history for the e-mail as identified as spam by the recipient; and the process ends. If a user does not designated predicted spam as spam, then the process passes to block 136.

Block 136 illustrates a determination as to whether or not the user identifies that the predicted spam is not spam. If the user identifies that the predicted spam is not spam, then the process passes to block 138. Block 138 depicts updating the user's inclusion list with the predicted spam that is not spam. In addition, the e-mail history is updated for the e-mail as identified not as spam by the recipient; and the process ends. If a user does not identify that the predicted spam is not spam, then the process passes to block 140.

Block 140 depicts a determination as to whether or not a user identifies non-predicted spam as spam. If a user identifies non-predicted spam as spam, then the process passes to block 142. Block 142 illustrates updating the e-mail history for the e-mail as identified as spam by the recipient; and the process ends. If a user does not identify non-predicted spam as spam, then the process passes to block 144. Block 144 depicts updating the network server according to other types of responses; and the process ends.

Figure 5:
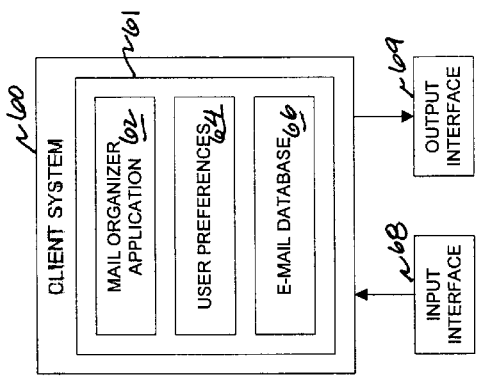
FIG. 5 depicts a block diagram of a client system in accordance with the method, system and program of the present invention.

With reference now to FIG. 5, there is depicted a block diagram of a client system in accordance with the method, system and program of the present invention. As illustrated, client system 60 includes a mail organizer application 62, user preferences 64, and an e-mail database 66 incorporated within a data storage medium 61 that may be internally, externally, or remotely accessible to client system 60. A user preferably provides input to client system via an input interface 68 and detects outputs via an output interface 69.

A user preferably supplies a user identification and password to mail organizer application 62. Mail organizer application 62 preferably asserts a communication link to a network server and transmits the user identification and password. In response to a successful log-in to the network server, client system 60 receives access to the user's e-mail folder of new and old mail. E-mail database 66 preferably temporarily holds a copy of the user's e-mail folder accessed from the network server.

Mail organizer application 62 preferably controls the organization and appearance of e-mail messages presented to the user via an output interface 69. In particular, mail organizer application 62 may specify organization and appearance of e-mail messages according to user preferences 64. User preferences 64 may designate multiple types of organization and appearance issues, such as the order in which messages are listed and the font size of listings.

A user may designate mail preferences at client system 60 that are stored: in user preferences 64 via an input interface 68. In addition, in accessing the user's e-mail folder from a network server, user preferences are preferably retrieved and temporarily stored in user preferences 64 while the user is logged-on.

In particular to the present invention, mail organizer application 62 specifically handles predicted spam according to spam handling rules designated by the user or corporation and spam handling rules built-in to the application. For example, mail organizer application 62 will graphically distinguish predicted spam according to a default setting, such as adding flags to predicted spam listings. However, a user may designate a preference for setting all predicted spam listings to a lower priority area of an in-box so that non-spam messages are viewed first and graphically highlighting predicted spam in yellow instead of adding flags.

Mail organizer application 62 preferably enables a user to quickly remove unwanted spam that has been predicted by the network server. In particular, a user may select in a single transaction to remove predicted spam to a trash folder. In addition, a user may designate a preference in user preferences 64 for all predicted spam to be automatically moved to a trash folder if a user does not open the predicted spam after a first session being displayed.

Moreover, mail organizer application 62 updates the network server as to a user's response to predicted spam and other e-mail messages. For example, a user may designate that an e-mail marked as predicted spam is not spam and also indicate that the network server should be updated so that e-mail from that user address or domain should not be marked as spam for that user. In another example, a user may designate that a particular unmarked e-mail should in fact be marked as spam by the network server. Mail organizer application 62 preferably transmits these user designations to the network server to be updated.

Figure 6:
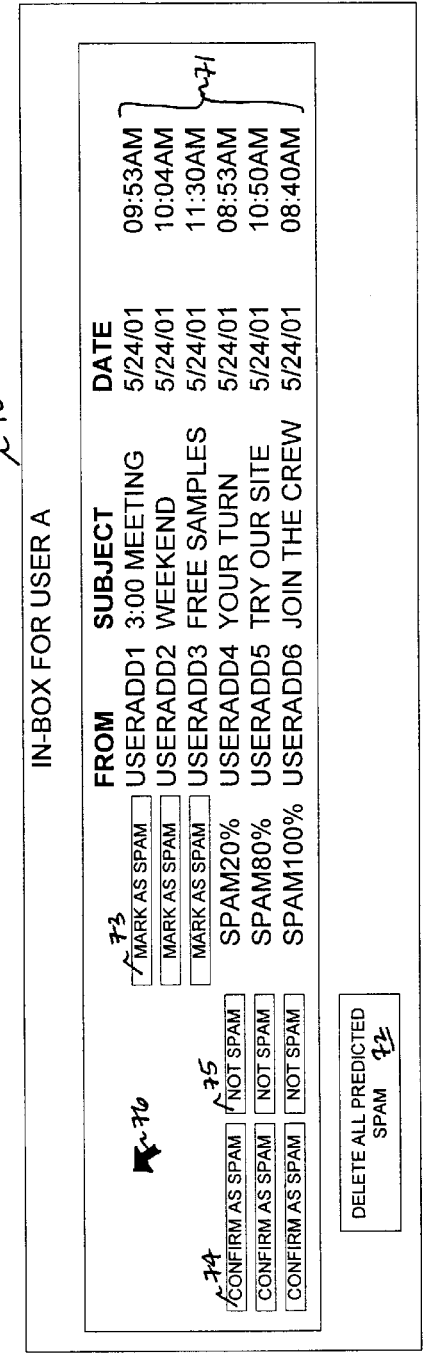
FIG. 6 illustrates a pictorial illustration of a display as designated by an electronic mail application at a client in accordance with the method, system and program of the present invention.

Referring now to FIG. 6, there is depicted a pictorial illustration of a display as designated by an electronic mail application at a client in accordance with the method, system and program of the present invention. As illustrated, a graphical display 70 comprises a listing 71 of accessed e-mails for "User A" from a network server at a client system. In the example, listing 71 first lists e-mails that are not predicted as spam and then lists e-mails that are predicted as spam in order from least likelihood as spam to greatest likelihood as spam. The example of listing 71 as depicted is one of many ways that e-mails predicted as spam may be graphically distinguished from e-mails not predicted as spam.

A user may preferably delete all predicted spam utilizing a single action, such as selecting a graphical button 72 utilizing a graphical pointer 76. Preferably, the position of graphical pointer 76 may be adjusted by a user adjusting the position of a mouse or other graphical pointer control device. The example of selecting graphical button 72 as illustrated is one of many ways that e-mails predicted as spam may be selected by a single action for deletion.

In addition, in the present example, a user may preferably mark e-mails as spam that were not predicted as spam, such as the e-mail received from "UserADD1", by selecting graphical button 73. A user may also designate that an e-mail predicted as spam, such as the e-mail received from "UserADD4", is considered spam by the user by selecting graphical button 74. Alternatively, a user may designate that an e-mail predicted as spam is not considered spam by the user by selecting graphical button 75.

Figure 7:
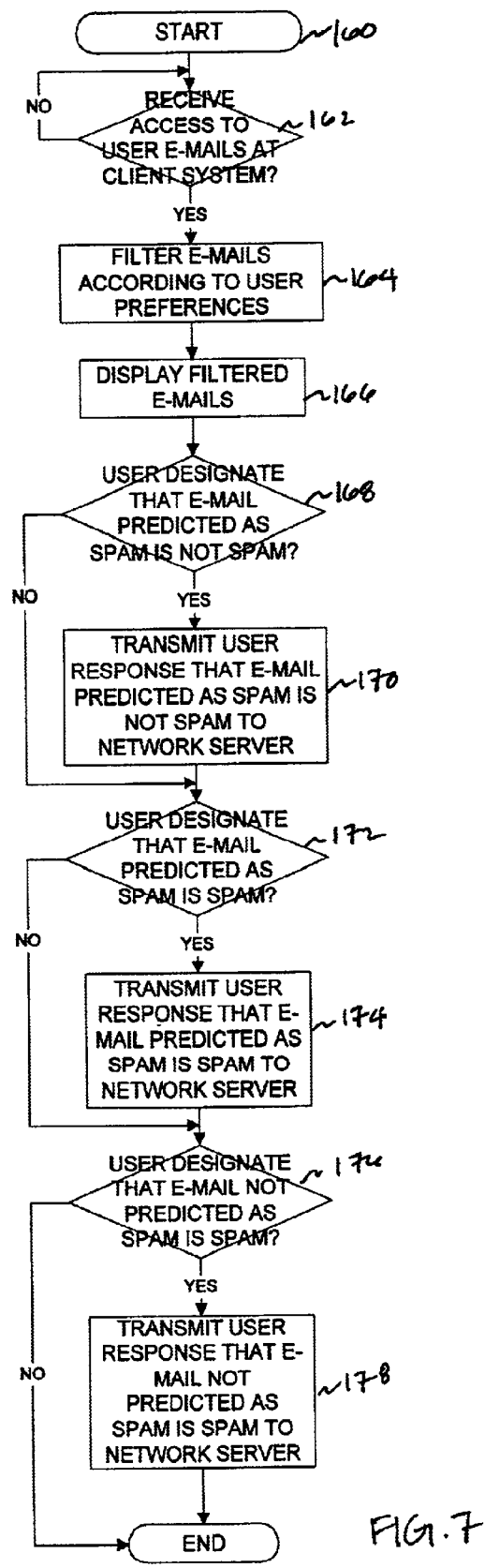
FIG. 7 depicts a high level logic flowchart of a process for managing electronic mail at a client in accordance with the present invention.

With reference now to FIG. 7, there is illustrated a high level logic flowchart of a process for managing electronic mail at a client in accordance with the present invention. As depicted, the process starts at block 160 and thereafter proceeds to block 162. Block 162 illustrates a determination as to whether or not access to e-mails from a network server for a particular user is received at a client system. If access is not received, then the process iterates at block 162. If access is received, then the process passes to block 164.

Block 164 depicts filtering the accessed e-mail according to user preferences. User preferences may be designated with the accessed e-mail or may be stored at the client system. Next, block 166 illustrates displaying the filtered e-mail for the user; and the process passes to block 168. In displaying the filtered e-mail, predicted spam is preferably graphically distinguished from e-mail that is not predicted as spam.

Block 168 illustrates a determination as to whether or not the user designates that e-mail predicted as spam is not spam. If the user does not designate that e-mail predicted as spam is not spam, then the process passes to block 172. If the user designates that e-mail predicted as spam is not spam, then the process passes to block 170. Block 170 depicts transmitting the user response that an e-mail predicted as spam is not spam to the network server; and the process passes to block 172.

Block 172 depicts a determination as to whether or not the user designates that e-mail predicted as spam is spam. If a user does not designate that e-mail predicted as spam is spam, then the process passes to block 176. If a user does designate that e-mail predicted as spam is spam, then the process passes to block 174. Block 174 illustrates transmitting the user response that an e-mail predicted as spam is spam to the network server; and the process passes to block 176.

Block 176 illustrates a determination as to whether or not the user designates that e-mail not predicted as spam is spam. If the user does not designate that e-mail not predicted as spam is spam, then the process ends. If the user does designate that e-mail predicted as spam is spam, then the process passes to block 178. Block 178 depicts transmitting the user response that an e-mail not predicted as spam is spam to the network server; and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for predicting undesirable electronic mail messages, said method comprising the computer-executed steps of:

receiving a plurality of electronic mail messages at a network server, wherein said plurality of electronic mail messages are addressed to a plurality of clients served by said network server;

analyzing said plurality of electronic mail messages to determine patterns of similarity among said plurality of electronic mail messages; and predicting and classifying a selection of said plurality of electronic mail messages as potentially undesirable electronic mail messages based on one or more patterns of similarity of messages within said selection to one another, such that said plurality of electronic mail messages classified as potentially undesirable electronic mail messages are identified prior to access from said network server.

2. The method for predicting undesirable electronic mail messages according to claim 1, said step of analyzing said plurality of electronic mail messages to determine patterns of similarity among said plurality of electronic mail messages, further comprising the step of:

analyzing said plurality of electronic mail messages to determine patterns of similarity according to filtering rules designated at said network server.

3. The method for predicting undesirable electronic mail messages according to claim 1, said step of analyzing said plurality of electronic mail messages to determine patterns of similarity among said plurality of electronic mail messages, further comprising the steps of:

comparing said plurality of electronic mail messages with a plurality of previously confirmed undesirable electronic mail messages; and designating a selection of said plurality of electronic mail messages that match said previously confirmed electronic mail messages as potentially undesirable electronic mail messages.

4. The method for predicting undesirable electronic mail messages according to claim 1, said step of analyzing said plurality of electronic mail messages to determine patterns of similarity among said plurality of electronic mail messages, further comprising the steps of:

comparing a number of recipients of each one of said plurality of electronic mail messages with a maximum number of recipients; and designating any of said plurality of electronic mail messages where said number of recipients exceeds said maximum number of recipients as potentially undesirable electronic mail messages.

5. The method for predicting undesirable electronic mail messages according to claim 1, said step of analyzing said plurality of electronic mail messages to determine patterns of similarity among said plurality of electronic mail messages, further comprising the steps of:

comparing user addresses from which said plurality of electronic mail messages are received; and designating a selection of said plurality of electronic mail messages that are received from a single user address as potentially undesirable electronic mail messages.

6. The method for predicting undesirable electronic mail messages according to claim 1, said step of analyzing said plurality of electronic mail messages to determine patterns of similarity among said plurality of electronic mail messages, further comprising the steps of:

comparing domains from which said plurality of electronic mail messages are received; and designating a selection of said plurality of electronic mail messages that are received from a single domain as potentially undesirable electronic mail messages.

7. The method for predicting undesirable electronic mail messages according to claim 1, said step of analyzing said plurality of electronic mail messages to determine patterns of similarity among said plurality of electronic mail messages, further comprising the steps of:

comparing titles of said plurality of electronic mail messages; and designating a selection of said plurality of electronic mail messages that are received with a similar title as potentially undesirable electronic mail messages.

8. The method for predicting undesirable electronic mail messages according to claim 1, said step of analyzing said plurality of electronic mail messages to determine patterns of similarity among said plurality of electronic mail messages, further comprising the steps of:

determining a selection of users who receive more than a particular volume of confirmed undesirable electronic mail messages;

comparing content of a newly received electronic mail messages with content of said confirmed undesirable electronic mail messages received by said selection of users; and designating said newly received electronic mail messages as potentially undesirable electronic mail messages if said content of said newly receive electronic mail messages matches content of any of said confirmed undesirable electronic mail messages.

9. The method for predicting undesirable electronic mail messages according to claim 1, said step of analyzing said plurality of electronic mail messages to determine patterns of similarity among said plurality of electronic mail messages, further comprising the steps of:

comparing content of a selection of said plurality of electronic mail messages that are similar in size; and designating selected ones with matching content from among said selection of said plurality of electronic mail messages that are similar in size as potentially undesirable electronic mail messages.

10. The method for predicting undesirable electronic mail messages according to claim 1, said step of analyzing said plurality of electronic mail messages to determine patterns of similarity among said plurality of electronic mail messages, further comprising the steps of:

comparing a number of addresses included in text of said plurality of electronic mail messages with a designated maximum number of addresses; and designating a selection of said plurality of electronic mail messages wherein said number of addresses included in said text exceeds said designated maximum number of addresses as potentially undesirable electronic mail messages.

11. The method for predicting undesirable electronic mail messages according to claim 1, said step of predicting and classifying a selection of said plurality of electronic mail messages as potentially undesirable electronic mail messages according to said analysis, further comprising the step of:
    assigning a percentage of predictability as potentially undesirable electronic mail messages to said plurality of electronic mail messages.

12. The method for predicting undesirable electronic mail messages according to claim 1, said method further comprising the steps of:
    receiving indicators of desirability of said plurality of electronic mail messages from said plurality of clients; and
    updating a plurality of filtering rules utilized in said analysis of said plurality of electronic mail messages according to said indicators of desirability received from said plurality of clients.

13. The method for predicting undesirable electronic mail messages according to claim 1, said method further comprising the step of:
    updating said plurality of electronic mail messages in response to determining a new type of undesirable electronic mail messages.

14. The method for predicting undesirable electronic mail messages according to claim 1, said method further comprising the step of:
    identifying said plurality of electronic mail classified as potentially undesirable electronic mail to said plurality of clients upon access from said network server.

15. The method for identifying undesirable electronic mail messages according to claim 1,
    wherein said step of determining that a pattern of similarity exists comprises comparing content of said plurality of electronic mail messages that are similar in size; and
    wherein said step of inferring that said plurality of electronic mail messages are potentially undesirable electronic mail messages comprises inferring that a plurality of electronic mail messages that are received with similar content are potentially undesirable electronic mail messages based on the number of such messages received with similar content.

16. A computer program product to provide prediction of undesirable electronic mail messages on a data processing system prior to transmission of said electronic mail messages to a client, said program product comprising:
    a storage medium;
    program instructions on said storage medium for:
        receiving a plurality of electronic mail messages at a network server, wherein said plurality of electronic mail messages is addressed to a plurality of clients served by said network server;
        analyzing said plurality of electronic mail messages to determine patterns of similarity among said plurality of electronic mail messages; and
        predicting and classifying a selection of said plurality of electronic mail messages as potentially undesirable electronic mail messages based on one or more patterns of similarity of messages within said selection to one another.

17. The computer program product according to claim 16, wherein said program instructions for said analyzing step further include program instructions for:
    analyzing said plurality of electronic mail messages to determine patterns of similarity according to filtering rules designated at said network server.

18. The computer program product according to claim 16, wherein said program instructions for said analyzing step further include program instructions for:
    comparing said plurality of electronic mail messages with a plurality of previously confirmed undesirable electronic mail messages; and
    designating a selection of said plurality of electronic mail messages that match said previously confirmed electronic mail messages as potentially undesirable electronic mail messages.

19. The computer program product according to claim 16, wherein said program instructions for said analyzing step further include program instructions for:
    comparing a number of recipients of each one of said plurality of electronic mail messages with a maximum number of recipients; and
    designating any of said plurality of electronic mail messages where said number of recipients exceeds said maximum number of recipients as potentially undesirable electronic mail messages.

20. The computer program product according to claim 16, wherein said program instructions for said analyzing step further include program instructions for:
    comparing user addresses from which said plurality of electronic mail messages are received; and
    designating a selection of said plurality of electronic mail messages that are received from a single user address as potentially undesirable electronic mail messages.

21. The computer program product according to claim 16, wherein said program instructions for said analyzing step further include program instructions for:
    comparing domains from which said plurality of electronic mail messages are received; and
    designating a selection of said plurality of electronic mail messages that are received from a single domain as potentially undesirable electronic mail messages.

22. The computer program product according to claim 16, wherein said program instructions for said analyzing step further include program instructions for:
    comparing titles of said plurality of electronic mail messages; and
    designating a selection of said plurality of electronic mail messages that are received with a similar title as potentially undesirable electronic mail messages.

23. The computer program product according to claim 16, wherein said program instructions for said analyzing step further include program instructions for:
    determining a selection of users who receive more than a particular volume of confirmed undesirable electronic mail messages;
    comparing content of a newly received electronic mail messages with content of said confirmed undesirable electronic mail messages received by said selection of users; and
    designating said newly received electronic mail messages as potentially undesirable electronic mail messages if said content of said newly receive electronic mail messages matches content of any of said confirmed undesirable electronic mail messages.

24. The computer program product according to claim 16, wherein said program instructions for said analyzing step further include program instructions for:
    comparing content of a selection of said plurality of electronic mail messages that are similar in size; and
    designating selected ones with matching content from among said selection of said plurality of electronic mail messages that are similar in size as potentially undesirable electronic mail messages.

25. The computer program product according to claim 16, wherein said program instructions for said analyzing step further include program instructions for:
   comparing a number of addresses included in text of said plurality of electronic mail messages with a designated maximum number of addresses; and
   designating a selection of said plurality of electronic mail messages wherein said number of addresses included in said text exceeds said designated maximum number of addresses as potentially undesirable electronic mail messages.

26. The computer program product according to claim 16, wherein said program instructions for said predicting and classifying step further include program instructions for:
   assigning a percentage of predictability as potentially undesirable electronic mail messages to said plurality of electronic mail messages.

27. The computer program product according to claim 15 further comprising program instructions for:
   receiving indicators of desirability of said plurality of electronic mail messages from said plurality of clients; and
   updating a plurality of filtering rules utilized in said analysis of said plurality of electronic mail messages according to said indicators of desirability received from said plurality of clients.

28. The computer program product according to claim 16 further comprising program instructions for:
   updating said plurality of electronic mail messages in response to determining a new type of undesirable electronic mail messages.

29. A method for identifying undesirable electronic mail messages, said method comprising the computer-executed steps of:
   receiving a plurality of electronic mail messages at a network server;
   determining that a pattern of similarity exists among said plurality of electronic mail messages, said pattern having no pre-defined association as potentially undesirable electronic mail;
   inferring that said plurality of electronic mail messages are potentially undesirable electronic mail messages based on the number of said plurality of messages exhibiting said pattern of similarity; and
   identifying said plurality of messages as potentially undesirable electronic mail messages responsive to said inferring step.

30. The method for identifying undesirable electronic mail messages according to claim 29,
   wherein said step of determining that a pattern of similarity exists comprises comparing user addresses from which said plurality of electronic mail messages are received; and
   wherein said step of inferring that said plurality of electronic mail messages are potentially undesirable electronic mail messages comprises inferring that a plurality of electronic mail messages that are received from a single user address are potentially undesirable electronic mail messages based on the number of such messages received from a single user address.

31. The method for identifying undesirable electronic mail messages according to claim 29,
   wherein said step of determining that a pattern of similarity exists comprises comparing domains from which said plurality of electronic mail messages are received; and
   wherein said step of inferring that said plurality of electronic mail messages are potentially undesirable electronic mail messages comprises inferring that a plurality of electronic mail messages that are received from a single domain are potentially undesirable electronic mail messages based on the number of such messages received from a single domain.

32. The method for identifying undesirable electronic mail messages according to claim 29,
   wherein said step of determining that a pattern of similarity exists comprises comparing titles of said plurality of electronic mail messages; and
   wherein said step of inferring that said plurality of electronic mail messages are potentially undesirable electronic mail messages comprises inferring that a plurality of electronic mail messages that are received with a similar title are potentially undesirable electronic mail messages based on the number of such messages received with a similar title.

33. The method for identifying undesirable electronic mail messages according to claim 29, said step of inferring that said plurality of electronic mail messages are potentially undesirable electronic mail messages further comprising the step of:
   assigning a percentage of predictability as potentially undesirable electronic mail messages to said plurality of electronic mail messages.

* * * * *